April 18, 1939.   R. S. BUCK   2,154,489
VIBRATION DAMPER
Filed Sept. 28, 1937   2 Sheets-Sheet 1

INVENTOR.
Richard S. Buck
BY Harris G. Luther
ATTORNEY

April 18, 1939. R. S. BUCK 2,154,489
VIBRATION DAMPER
Filed Sept. 28, 1937 2 Sheets-Sheet 2
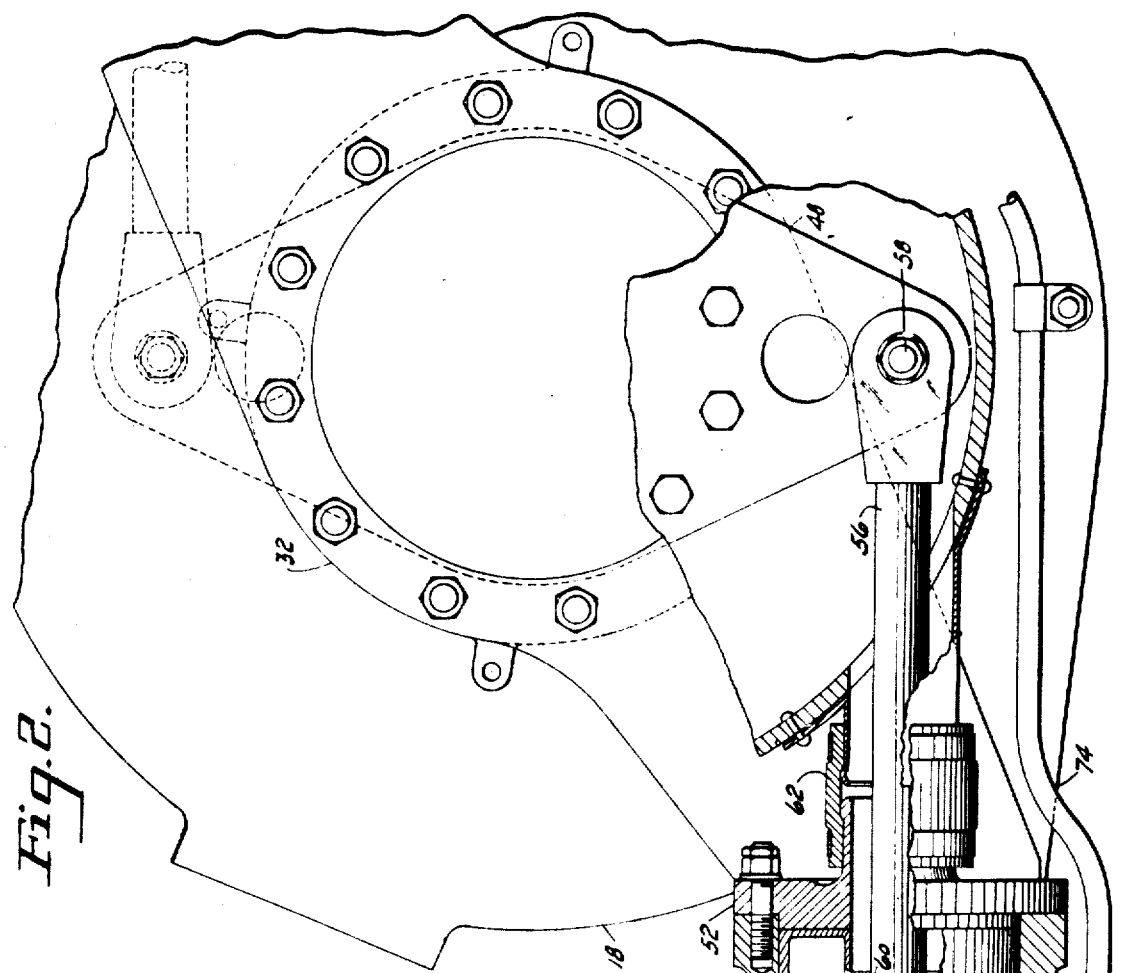
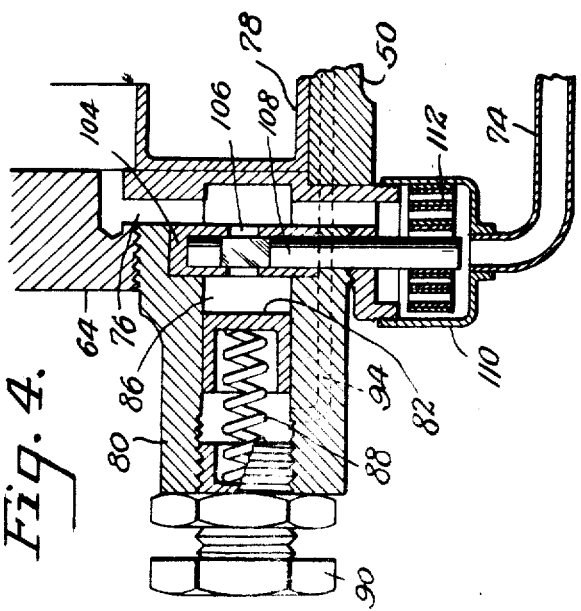
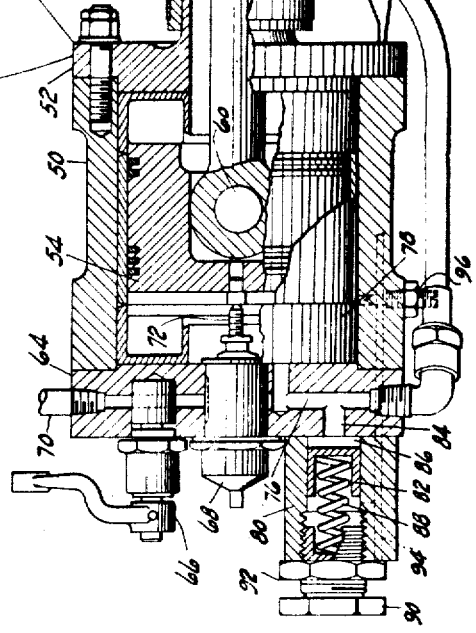
INVENTOR.
Richard S. Buck
BY Harris G. Luther
ATTORNEY Patented Apr. 18, 1939

2,154,489

UNITED STATES PATENT OFFICE 2,154,489

VIBRATION DAMPER

Richard S. Buck, Wethersfield, Conn., assignor to United Aircraft Corporation, East Hartford, Conn., a corporation of Delaware Application September 28, 1937, Serial No. 166,078

11 Claims. (Cl. 74—305)

This invention relates to improvements in vibration reducing means and has particular reference to a vibration reducing means for a power plant such as an internal combustion engine.

An object of the invention resides in the provision of improved means for cushioning vibrations produced by an engine in the process of developing power.

A further object resides in the provision of a resilient hydraulic driving connection between a power plant and a device driven thereby.

A still further object resides in the provision of a resilient connection interposed between a driving and driven element effective to change the natural frequency of harmonic vibration of the driving element and driven element combination.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the invention. The drawings, however, are for the purpose of illustration only and are not to be taken as limiting the invention, the scope of which is to be measured by the scope of the appended claims.

In the drawings,

Fig. 2 is a front elevational view of the internal combustion engine having a vibration damper incorporating this invention, portions being broken away and shown in sections to better illustrate the construction thereof.

Figure 3:
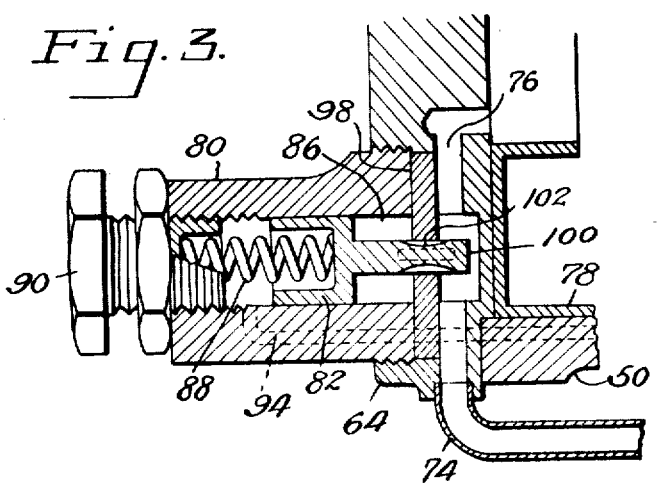

Fig. 3 is a sectional view on an enlarged scale of the vibration damping elements particularly illustrated in Fig. 2 showing the application thereto of a valve arranged to automatically vary the restriction to the flow of hydraulic fluid to the vibration damping portion of the apparatus, and Fig. 4 is a view similar to Fig. 3 showing the application to the vibration damping apparatus of a temperature controlled valve for variably restricting the flow of hydraulic fluid to the vibration damping portion of the apparatus.

Referring to the drawings in detail the engine illustrated by way of example for the purpose of this disclosure is a geared internal combustion engine particularly adapted to drive an aeronautical propeller for the propulsion of an aircraft. The engine itself may be of any suitable form, and the invention may be applied with equal facility to engines other than aeronautical engines and may also, if desired, be applied to power plants other than internal combustion engines.

In the drawings the numeral 10 indicates a fragmentary portion of the engine crankshaft. The power shaft or propeller drive shaft 12 has a spigot bearing 14 in the end of the hollow crankshaft 10 and is additionally supported by antifriction bearing 16 carried by the engine nose piece 18 through which the power shaft extends. The power shaft 12 is rotatable relative to the crankshaft 10 and is operatively connected thereto by a planetary reduction gearing. A drive gear 20 is non-rotatably secured upon the end of the crankshaft 10 and is supported for rotation by the bearing 22 mounted in the transverse partition member 24. The drive gear 20 meshes with a plurality of planetary gears, as is indicated at 26, rotatably mounted upon respective axles 28 carried by a cage 30 splined to the power shaft 12. At their inner sides the planetary gears 26 mesh with a relatively fixed sun gear 32 which is carried upon a bearing pad 34 interposed between it and the sleeve portion of the cage member 30. Oil for lubricating the engine or for operating a controllable pitch propeller driven by the engine may be carried to the interior of the hollow power shaft 12 through the oil collector ring 36 and radial apertures 38. A flanged ring member 40 surrounds the ring 36 and also constitutes a retaining member for supporting one side of the bear 16 against lateral movements with respect to the opening in the nose piece 18 in which the bearing is mounted. A cover member 42 supports the opposite side of the bear 16 and encircles a nut 44 screw-threaded upon the power shaft to clamp the inner race of bearing 16 between itself and a shoulder 46 on the shaft to restrain the shaft against axial movements with respect to the nose piece of the engine.

The reduction gear construction so far described is well-known to the art and it is believed that a more detailed description thereof is unnecessary for the purpose of this disclosure.

Usually the sun gear element 32 is rigidly secured to the engine nose piece to restrain it against rotation and render it effective as a reaction member for the force imparted to the planetary gears 26 by the drive gear 20 so that the cage 30 will be caused to rotate about the sun gear carrying with it the drive shaft 12 at a speed less than the rotational speed of the crankshaft 10. In accordance with the present invention, however, the sun gear 32 has rigidly secured to the flange sleeve portion 46 thereof an apertured lever member 48 which extends radially outward at opposite sides of the sun gear to provide a pair of lever members for attachment to a hydraulic mechanism which restrains the sun gear 32 against rotation and simultaneously introduces a desired degree of resiliency or flexibility in the drive between the engine and the propeller or other engine driven device.

The hydraulic mechanism referred to is particularly illustrated in Fig. 2 and includes a pair of cylinders, one of which is indicated at 50, rigidly secured to respective pads as indicated at 52 formed on the engine nose piece 18, and pistons, one of which is indicated at 54, slidably mounted in respective cylinders 50 and connected by means of suitable connecting rods 56 to the respective oppositely disposed lever portions of the member 48. As the two opposed parts of the hydraulic mechanism are exactly similar, it is considered that a detailed description of only one of the similar parts is sufficient for the purpose of this disclosure.

The cylinder 50 is supported in tangential alignment with the respective lever portion of the member 48, and the piston rod 56 is pivotally connected to the lever portion, as indicated at 58, and is likewise pivotally connected to the piston by a suitable wrist pin, as indicated at 60. Where the rod 56 extends outside of the nose piece 18, it is enclosed in a suitable oil tight jointed casing, as indicated at 62. At its end opposite the pad 52, through which the piston rod 56 extends, the cylinder is provided with a head 64 which carries a plurality of valves, as indicated at 66 and 68. The valve 68 is connected through the manually actuatable valve 66 with a line 70 leading from a source of fluid under pressure. The valve 68 has an actuating portion 72 which extends within the cylinder 50 in position to be contacted by the outer end of the piston 54 as the piston moves outwardly in the cylinder. If the piston moves the actuating element 72 outwardly to a predetermined position, the valve 68 is opened to admit additional fluid to the space between the head 64 and the piston 54 to force the piston backwardly in the cylinder.

From the construction so far described, it will be observed that rotation of the sun gear 32 is resisted by the compression of the fluid trapped in the space between the piston 54 and the head 64 of the cylinder 50 and that the amount of pressure exerted upon this fluid may be measured to indicate the torque being exerted by the engine. In order to measure this fluid pressure a fluid line 74 may be connected at one end with the channel 76 which leads through the head 64 and opens into the space 78 between the piston and the cylinder head. At its opposite end the fluid line 74 is connected with a suitable pressure gauge, not illustrated, which may if desired, be directly calibrated in torque units.

One or more auxiliary cylinders, as indicated at 80, may be mounted upon the head 64 of the cylinder 50. The auxiliary cylinder, or each of the several auxiliary cylinders, contains a slidable piston 82 having its closed or head end opposed to the adjacent surface of the head 64. An oil passage 84 leads from the passage 76 to the space 86 between the piston 82 and the adjacent surface of the head 64 so that when pressure is exerted upon the fluid in the space 78, the fluid will flow through the channels 76 and 84 into the space 86 and tend to force the piston 82 outwardly in the cylinder 80. The oil passage 84 is preferably a restricted orifice. There may be one such passage 84 for each piston 82 or there may be a plurality thereof for each piston 82. The passage 84 may be a fixed passage or it may be provided with a controllable valve to vary the amount of restriction. Provision may also be made to vary the restriction by means of automatically operated valves, such for instance as thermostatically controlled valves as particularly shown in Fig. 4 or valves controlled by the pressure of the surrounding fluid as particularly shown in Fig. 3. The restricted passage 84 acts to damp the flow of oil and thereby convert at least a portion of the energy of vibration into heat in the hydraulic fluid. Movement of the piston 82 is opposed by some suitable resilient means, for instance by a compression spring 88, which is received at one end in the cup-shaped piston 82, and at the other end in the cup-shaped end of an abutment 90 screw-threaded into the open end of the cylinder 80 and retained in adjusted position therein by the lock nut 92. A vent channel 94 leads from the space between the piston 82 and the abutment 90 to some suitable sump such as the interior of the nose piece 18 so that movement of the piston 82 will not be interfered with by compression of any fluid in the space between the piston and the abutment and this channel also connects, through a restricted passage, with the compression space in the cylinder 50 to maintain a continuous flow of oil through the cylinder and thereby avoid the effects of trapping appreciable quantities of air in the cylinder. A screw valve 96 controls the drainage of fluid through the channel 94.

Figure 1:
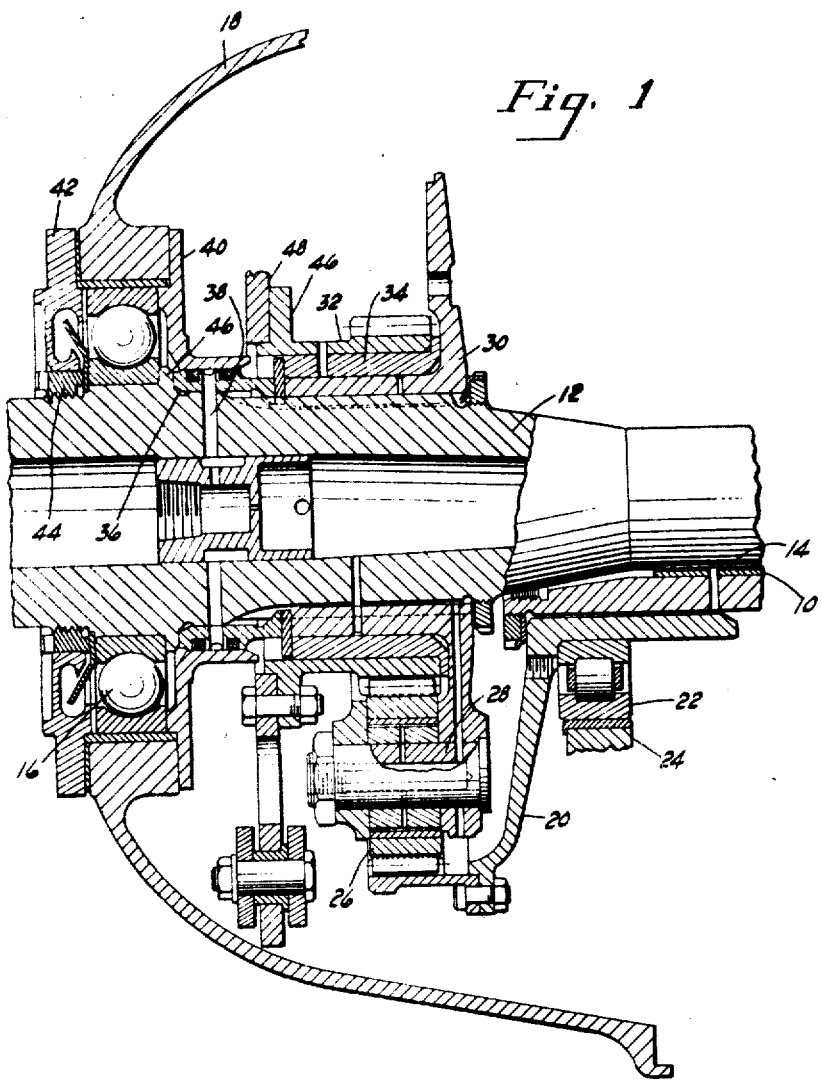
Fig. 1 is a sectional view of a fragmentary portion of an engine and power transmitting reduction gear.

With the above described construction it will be observed that any roughness or unevenness in the rotation of the crankshaft 10 caused by the operation of the engine may be transmitted alternatively either to the cage 30 or to the sun gear 32. If the sun gear is rigidly fixed, the vibrational forces will be transmitted to the cage; however, if the sun gear has a limited freedom of resiliently resisted rotational movement, this movement may be used to absorb the amplitude of the uneven vibrational forces delivered by the crankshaft. With the sun gear restrained against rotation by the hydraulic mechanism, illustrated in Fig. 1, and exerting its reactive force against the hydraulic fluid and the spring balance piston 82, the sun gear may be given sufficient freedom of resiliently resisted rotational movement to cause a flow of oil through orifice 84 and movement of spring 88 and thus absorb vibrational forces delivered by the crankshaft. With the above described mechanism, the rotation of the power shaft 12 may for all practical purposes be rendered uniform and vibrationless, at least, insofar as rotational vibrational forces of the engine are concerned. By suitably proportioning the size and number of the passages 84 and/or the characteristics of the spring 88, the device may be rendered most efficient in absorbing any selected band or bands of vibrational forces.

In the form of the invention illustrated in Fig. 3, an apertured washer or partition member 98 is disposed between the channel 76 and the interior of the small cylinder 80. This partition member may be conveniently held in place by inserting it in an internally screw threaded aperture provided in the head 64 of the main cylinder 50 and screwing the small cylinder 80 down upon it. The small piston 82 is provided with an extension 100 which projects through the aperture in the partition member 98 and is provided with tapering slots as indicated at 102 so that the restriction of the orifice between the interior of the cylinder 50 and the interior of the cylinder 80 is determined by the position of the piston 82.

In the form of the invention shown in Fig. 4 a partition member 104 is clamped between the small cylinder 80 and the head 64 of the large cylinder 50 and, as illustrated, is retained in an internal recess provided in the open end of the small cylinder. This partition member is provided with a substantially coaxial aperture therethrough as indicated at 106 and with a substantially diametrical well or bore which rotatably receives a valve stem 108 having a flat portion adjacent the aperture 106. This valve stem extends through the portions of the cylinders 50 and 80 adjacent to the partition member 104 and into a sealed compartment 110 provided on the exterior of the head 64 of the cylinder 50 and connected with the channel 76 and with the conduits 74. Within the compartment 110 a thermostat 112 in the form of a coiled bimetallic strip is connected to the end of the valve stem 108 and to the casing of the compartment 110 in such a manner that in coiling or uncoiling in response to changes in the temperature of the fluid flowing through the compartment it turns the valve stem 108 to vary the restriction of the orifice 106.

While there has been illustrated and described a suitable mechanical embodiment of what is now considered to be the preferred form of the invention, it is to be understood that the invention is not limited to the particular constructional form so illustrated and described but that such changes in the size, shape and arrangement of parts may be resorted to as come within the scope of the appended claims.

Having now described the invention so that others skilled in the art may clearly understand the same, what it is desired to secure by Letters Patent is as follows:

1. In combination with a driving element subject to torsional vibrations, a driven element, and a power transmitting reduction gear having a reaction element interposed between said driving and driven elements, a torque indicating and torque variation reducing device operatively associated with said reaction gear element comprising, a main variable volume fluid displacing device operatively connected with said reaction gear element to resist torque reaction induced by rotation thereof, and an auxiliary variable volume device of relatively small inertia and small capacity resiliently urged toward its minimum capacity connected to said main variable volume device to receive fluid displaced therefrom and provide for said reaction element a limited freedom of vibration absorbing movements opposed by fluid friction damped resilient force.

2. In combination with a driving element subject to torsional vibrations, a driven element, and a power transmitting reduction gear having a reaction element interposed between said driving and driven elements, a main variable volume device operatively connected with said reaction gear element to oppose rotational movements thereof by converting the rotational force imposed on said reaction elements into fluid pressure, and means for reducing vibrational forces between said driving and driven elements comprising, an auxiliary variable volume device of relatively slight inertia connected to said main variable volume device by a restricted orifice, and means resiliently opposing changes in volume of said auxiliary variable volume device to permit in said main variable volume device relatively small vibration induced volumetric changes opposed by fluid friction damped resilient force.

3. In combination with a driving element subject to torsional vibrations, a driven element, and a power transmitting reduction gear having a reaction element interposed between said driving and driven elements, a main piston operatively connected to said gear reaction element, a relatively fixed cylinder for said piston. and means comprising, a second cylinder, an auxiliary piston of relatively slight inertia reciprocable in said second cylinder, and means resiliently opposing movements of said auxiliary piston to permit relatively slight vibration induced movements of said main piston to absorb vibrational forces between said driving and driven elements.

4. In combination with a driving element subject to torsional vibrations, a driven element, and a power transmitting reduction gear having a reaction element interposed between said driving and driven elements, a piston operatively connected to said gear reaction element, a relatively fixed cylinder for said piston, means for maintaining fluid under pressure in the space between said piston and the head of said cylinder, and means for maintaining the pressure of said fluid substantially constant.

5. In combination with a driving element subject to torsional vibrations, a driven element, and a power transmitting reduction gear having a reaction element interposed between said driving and driven elements, a piston operatively connected to said gear reaction element, a relatively fixed cylinder for said piston, means for maintaining fluid under pressure in the space between said piston and the head of said cylinder, a second cylinder connected with said first mentioned cylinder and a spring balanced piston in said second cylinder to absorb pressure surges in the hydraulic fluid in said first mentioned cylinder.

6. In combination with a rotatable driving element subject to relatively high frequency torque variations, a driven element, and a power transmitting reduction gear having a torque reaction element, a piston operatively connected to said gear reaction element, a relatively fixed cylinder for said piston, means for maintaining fluid under pressure in the space between said piston and the head of said cylinder, and resilient means hydraulically connected with said space to absorb high frequency pressure surges in said hydraulic fluid.

7. Vibration reducing means for a torque transmitting drive comprising, a hydraulic piston and cylinder device operatively connected to said drive in such a manner that torque transmitted by said drive tends to move said piston, and hydraulic pressure actuated means resiliently resisting movement of said piston, and a restricted hydraulic passage between said piston and cylinder device and said hydraulic pressure actuated means.

8. Vibration reducing means for a torque transmission drive including a torque reaction element comprising, a relatively large hydraulic expansible chamber device operatively connected with said torque reaction element, one or more relatively small expansible chamber devices operatively connected with said relatively large expansible chamber device, and one or more restricted passages for hydraulic fluid between each relatively small expansible chamber device and said relatively large expansible chamber device.

9. Torque equalizing means for a power transmission comprising, means for transmitting torque variations into changes in fluid pressure, resilient means for relieving increases in fluid pressure caused by torque variations of frequency likely to produce vibration and means for variably restricting the flow of fluid to and from said pressure relieving means.

10. Vibration reducing means for a torque transmitting drive comprising, a hydraulic piston and cylinder device operatively connected to said drive in such a manner that torque transmitted by said drive tends to move said piston, and means comprising, an auxiliary cylinder of small capacity connected with said torque opposing cylinder, an auxiliary piston of small inertia capable of movements at vibration frequencies in said auxiliary cylinder, and a spring resiliently opposing movement of said auxiliary piston to permit a freedom of resiliently resisted movements of said torque resisting piston at small amplitudes and high frequency.

11. Torque equalizing and indicating means for a power transmission comprising, means for transmitting torque variations into changes in fluid pressure, resilient means for relieving increases in fluid pressure due to torque variations of relatively small amplitude and relatively high frequency, and means for indicating the average pressure of said fluid.

RICHARD S. BUCK.

CERTIFICATE OF CORRECTION.

Patent No. 2,154,489.   April 18, 1939.

RICHARD S. BUCK.

It is hereby certified that error appears in the printed specification of the above numbered patent requiring correction as follows: Page 4, first column, line 1, and second column, line 9, claims 9 and 11 respectively, for the word "transmitting" read transmuting; and that the said Letters Patent should be read with this correction therein that the same may conform to the record of the case in the Patent Office.

Signed and sealed this 15th day of August, A. D. 1939.

Leslie Frazer (Seal)   Acting Commissioner of Patents.

mission comprising, means for transmitting torque variations into changes in fluid pressure, resilient means for relieving increases in fluid pressure caused by torque variations of frequency likely to produce vibration and means for variably restricting the flow of fluid to and from said pressure relieving means.

10. Vibration reducing means for a torque transmitting drive comprising, a hydraulic piston and cylinder device operatively connected to said drive in such a manner that torque transmitted by said drive tends to move said piston, and means comprising, an auxiliary cylinder of small capacity connected with said torque opposing cylinder, an auxiliary piston of small inertia capable of movements at vibration frequencies in said auxiliary cylinder, and a spring resiliently opposing movement of said auxiliary piston to permit a freedom of resiliently resisted movements of said torque resisting piston at small amplitudes and high frequency.

11. Torque equalizing and indicating means for a power transmission comprising, means for transmitting torque variations into changes in fluid pressure, resilient means for relieving increases in fluid pressure due to torque variations of relatively small amplitude and relatively high frequency, and means for indicating the average pressure of said fluid.

RICHARD S. BUCK.

---

CERTIFICATE OF CORRECTION.

Patent No. 2,154,489.                         April 18, 1939.

RICHARD S. BUCK.

It is hereby certified that error appears in the printed specification of the above numbered patent requiring correction as follows: Page 4, first column, line 1, and second column, line 9, claims 9 and 11 respectively, for the word "transmitting" read transmuting; and that the said Letters Patent should be read with this correction therein that the same may conform to the record of the case in the Patent Office.

Signed and sealed this 15th day of August, A. D. 1939.

Leslie Frazer (Seal)                               Acting Commissioner of Patents.